(12) United States Patent
Huang et al.

(10) Patent No.: US 9,633,276 B2
(45) Date of Patent: Apr. 25, 2017

(54) BLOOD DETECTION SYSTEM WITH REAL-TIME CAPABILITY AND METHOD OF OPERATION THEREOF

(71) Applicant: Sony Corporation, Tokyo (JP)

(72) Inventors: Albert Huang, Cupertino, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 53 days.

(21) Appl. No.: 14/331,028

(22) Filed: Jul. 14, 2014

(65) Prior Publication Data

US 2016/0012306 A1 Jan. 14, 2016

(51) Int. Cl.
G06K 9/00 (2006.01)
G06K 9/46 (2006.01)
G06T 7/00 (2017.01)

(52) U.S. Cl.
CPC ......... *G06K 9/4652* (2013.01); *G06K 9/4642* (2013.01); *G06T 7/0016* (2013.01); *G06T 7/0081* (2013.01); *G06T 2207/10024* (2013.01); *G06T 2207/10056* (2013.01); *G06T 2207/10068* (2013.01); *G06T 2207/20021* (2013.01); *G06T 2207/20076* (2013.01); *G06T 2207/20148* (2013.01)

(58) Field of Classification Search
None
See application file for complete search history.

(56) References Cited

U.S. PATENT DOCUMENTS

| 8,090,177 | B2 |  | 1/2012 | Venkataraman et al. |  |
|---|---|---|---|---|---|
| 8,626,268 | B2 | * | 1/2014 | Adler | A61B 1/00009 600/302 |
| 2002/0177779 | A1 | * | 11/2002 | Adler | A61B 1/00009 600/476 |
| 2005/0014995 | A1 | * | 1/2005 | Amundson | A61B 1/018 600/105 |
| 2009/0196476 | A1 | * | 8/2009 | Inoue | A61B 1/04 382/128 |
| 2009/0196495 | A1 | * | 8/2009 | Inoue | G06K 9/4638 382/165 |
| 2010/0208047 | A1 | * | 8/2010 | Kitamura | A61B 1/041 348/65 |
| 2011/0306855 | A1 | * | 12/2011 | Rabinovitz | A61B 5/0084 600/310 |
| 2012/0051640 | A1 | * | 3/2012 | Kanda | G06T 7/0012 382/173 |

(Continued)

OTHER PUBLICATIONS

Y. Lee et al. "Real-Time image analysis of capsule endoscopy for bleeding discrimination in embedded system platform", World Academy of Science, Engineering and Technology, 2011: p. 2526-2530.*

(Continued)

*Primary Examiner* — Vu Le
*Assistant Examiner* — Samah Beg
(74) *Attorney, Agent, or Firm* — Haverstock & Owens LLP (57) ABSTRACT

A blood detection system, and a method of operation thereof, including: a camera for obtaining an input image frame; and a processing unit connected to the camera, the processing unit including: an image block module for extracting image blocks from the input image frame, and an automatic blood detection module, coupled to the image block module, for calculating an overall blood probability of the image blocks including: determining a red color dominance probability, determining a red color deviation probability, and determining a red color colorfulness probability.

21 Claims, 7 Drawing Sheets

(56) References Cited

U.S. PATENT DOCUMENTS

| | | | |
|---|---|---|---|
| 2012/0157820 A1* | 6/2012 | Zhang | A61B 3/12 600/407 |
| 2012/0251009 A1* | 10/2012 | Kanda | G06T 7/0012 382/195 |
| 2012/0281078 A1* | 11/2012 | Kobayashi | A61B 1/00016 348/65 |
| 2012/0316421 A1 | 12/2012 | Kumar et al. | |
| 2013/0109915 A1* | 5/2013 | Krupnik | G06T 3/4038 600/109 |
| 2013/0121546 A1 | 5/2013 | Guissin | |
| 2013/0301901 A1 | 11/2013 | Satish et al. | |
| 2014/0031659 A1* | 1/2014 | Zhao | A61B 1/00009 600/371 |
| 2014/0039287 A1 | 2/2014 | Adler et al. | |
| 2014/0213871 A1* | 7/2014 | Watanabe | A61B 5/02042 600/371 |

OTHER PUBLICATIONS

Sainju, S., Bui, F. M., & Wahid, K. A. (2014). Automated bleeding detection in capsule endoscopy videos using statistical features and region growing.Journal of medical systems, 38(4), 1-11.*

Pan, G., Yan, G., Qiu, X., & Cui, J. (2011). Bleeding detection in wireless capsule endoscopy based on probabilistic neural network. Journal of medical systems, 35(6), 1477-1484.*

Mackiewicz, M. W., Fisher, M., & Jamieson, C. (Mar. 2008). Bleeding detection in wireless capsule endoscopy using adaptive colour histogram model and support vector classification. In Medical Imaging (pp. 69140R-69140R). International Society for Optics and Photonics.*

Hwang, S., Oh, J., Cox, J., Tang, S. J., & Tibbals, H. F. (Mar. 2006). Blood detection in wireless capsule endoscopy using expectation maximization clustering. In Medical Imaging (pp. 61441P-61441P). International Society for Optics and Photonics.*

International Search Report and Written Opinion for PCT App # PCT/US2015/038811 dated Sep. 23, 2015.

Katouzian et al., "Automatic Detection of Blood versus non-Blood Regions on Intravascular Ultrasound (IVUS) Images Using Wavelet Packet Signatures", "Ultrasonic Imaging and Signal Processing", 2008, p. 8 pages, vol. 6920, Medical Imaging 2008.

Lee et al., "Algorithm for Bleeding Determination Based on Object Recognition and Local Color Features in Capsule Endoscopy", "International Science Index", Jun. 21, 2013, pp. 2069-2071, vol. 7, No. 6, World Academy of Science, Engineering and Technology.

Penna et al., "A Technique for Blood Detection in Wireless Capsule Endoscopy Images", Aug. 2009, pp. 1864-1868, 17th European Signal Processing Conference, Glasgow, Scotland.

* cited by examiner

BLOOD DETECTION SYSTEM WITH REAL-TIME CAPABILITY AND METHOD OF OPERATION THEREOF

TECHNICAL FIELD

The present invention relates generally to a blood detection system, and more particularly to a system for real-time detection of blood.

BACKGROUND ART

Advances in medical technology have improved recovery times and reduced complication rates. One significant advance is the increasing prevalence of endoscopic diagnosis and laparoscopic surgery, which avoids the need for cutting large holes in a patient by using small incisions to insert tools and a camera (i.e., endoscope or laparoscope) so the doctor or surgeon can see inside the patient. In any surgery, there are risks involved, and the ability for a physician to easily mitigate those risks is paramount to the success of the surgery.

However, the images from an endoscopic or laparoscopic camera can be of low quality due to a number of issues such as over- or under-exposure, insufficient light, condensation, bodily fluids obscuring the lens, or other problems. Even with high-quality images, inattention due to fatigue or other distractions can allow small problems in surgery to become large ones.

Thus, a need still remains for a real-time means of detecting problems during diagnosis or surgery. In view of the ever-growing importance of healthcare, it is increasingly critical that answers be found to these problems. Growing consumer expectations and the diminishing opportunities for meaningful product differentiation in the marketplace make it critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a blood detection system including: obtaining an input image frame with a camera; extracting image blocks from the input image frame; and calculating an overall blood probability of the image blocks including: determining a red color dominance probability, determining a red color deviation probability, and determining a red color colorfulness probability.

The present invention provides a blood detection system, including: a camera for obtaining an input image frame; and a processing unit connected to the camera, the processing unit including: an image block module for extracting image blocks from the input image frame, and an automatic blood detection module, coupled to the image block module, for calculating an overall blood probability of the image blocks including: determining a red color dominance probability, determining a red color deviation probability, and determining a red color colorfulness probability.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

For expository purposes, the term "horizontal" as used herein is defined as a plane parallel to the plane of the bottom of the display interface, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures.

Figure 1:
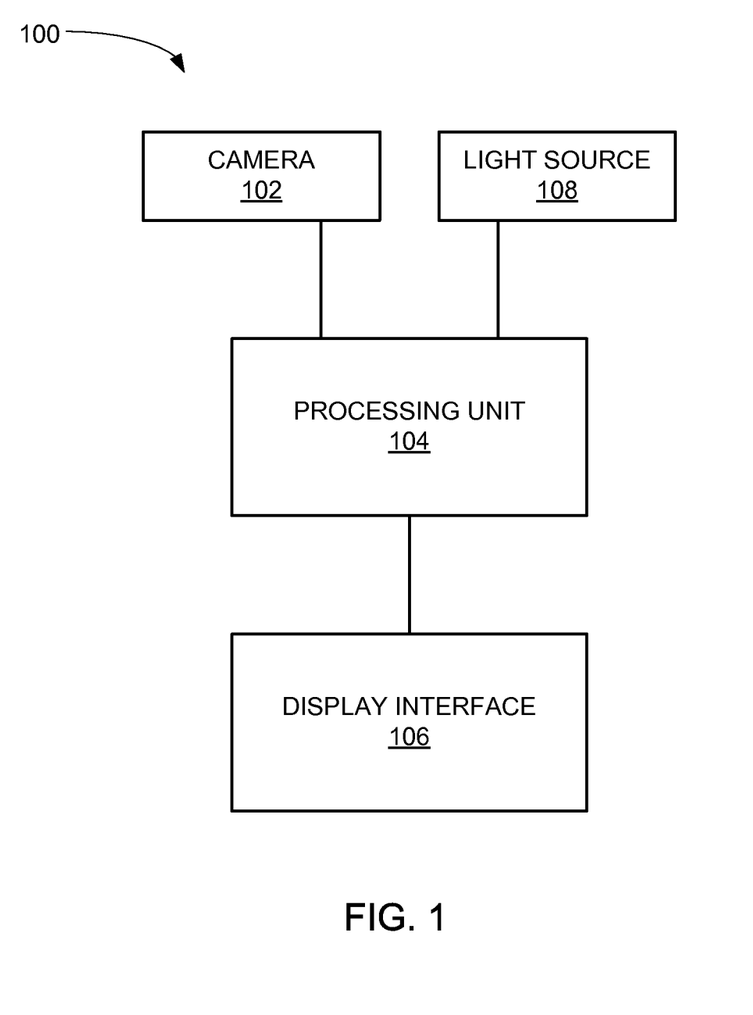
FIG. 1 is a schematic of a blood detection system in a first embodiment of the present invention.

Referring now to FIG. 1, therein is shown a schematic of a blood detection system 100 in a first embodiment of the present invention. Shown are a camera 102, a processing unit 104, and a display interface 106.

The camera 102 can be a camera capable of capturing video. The camera 102 is connected to the processing unit 104, which is connected to the display interface 106. The display interface 106 displays the view of the camera 102. Also connected to the processing unit 104 is a light source 108 for illuminating objects in view of the camera 102. The processing unit 104 is shown as connected to the light source 108 for illustrative purposes, and it is understood that the light source 108 can also be separate from the processing unit 104.

The processing unit 104 can be any of a variety of semiconductor devices such as a general purpose computer, a specialized device, embedded system, or simply a computer chip integrated with the camera and/or the display interface 106. The display interface 106 can utilize a variety of display technologies such as LCD, LED-LCD, plasma, holographic, OLED, front and rear projection, CRT, or other display technologies.

The processing unit 104 can contain many modules capable of performing various functions. For example, the processing unit 104 can have an image block module coupled to an automatic blood detection module containing a red color dominance module, a red color deviation module, a red color colorfulness module, and a threshold module, a masking module coupled to the automatic blood detection module, and an overlay module coupled to the masking module. The processing unit can run some or all of the modules simultaneously.

For example, the camera 102 can be used in conjunction with the light source 108 and surgical tools in order to perform laparoscopic surgery, which is also known as minimally invasive surgery. The camera 102, the light source 108, and the surgical tools can be inserted into a patient, with the display interface 106 showing a view from the camera 102 illuminated by the light source 108 of the area to be manipulated with the surgical tools. Laparoscopic surgery is given as an example of how the blood detection system 100 can be used, but it is understood that the blood detection system 100 can be used in different contexts. For example, the blood detection system 100 can be integrated into an endoscope, a microscope, a handheld camera, a phone, or a tablet, or operated as a camera attached to a personal computer or a laptop.

Figure 2:
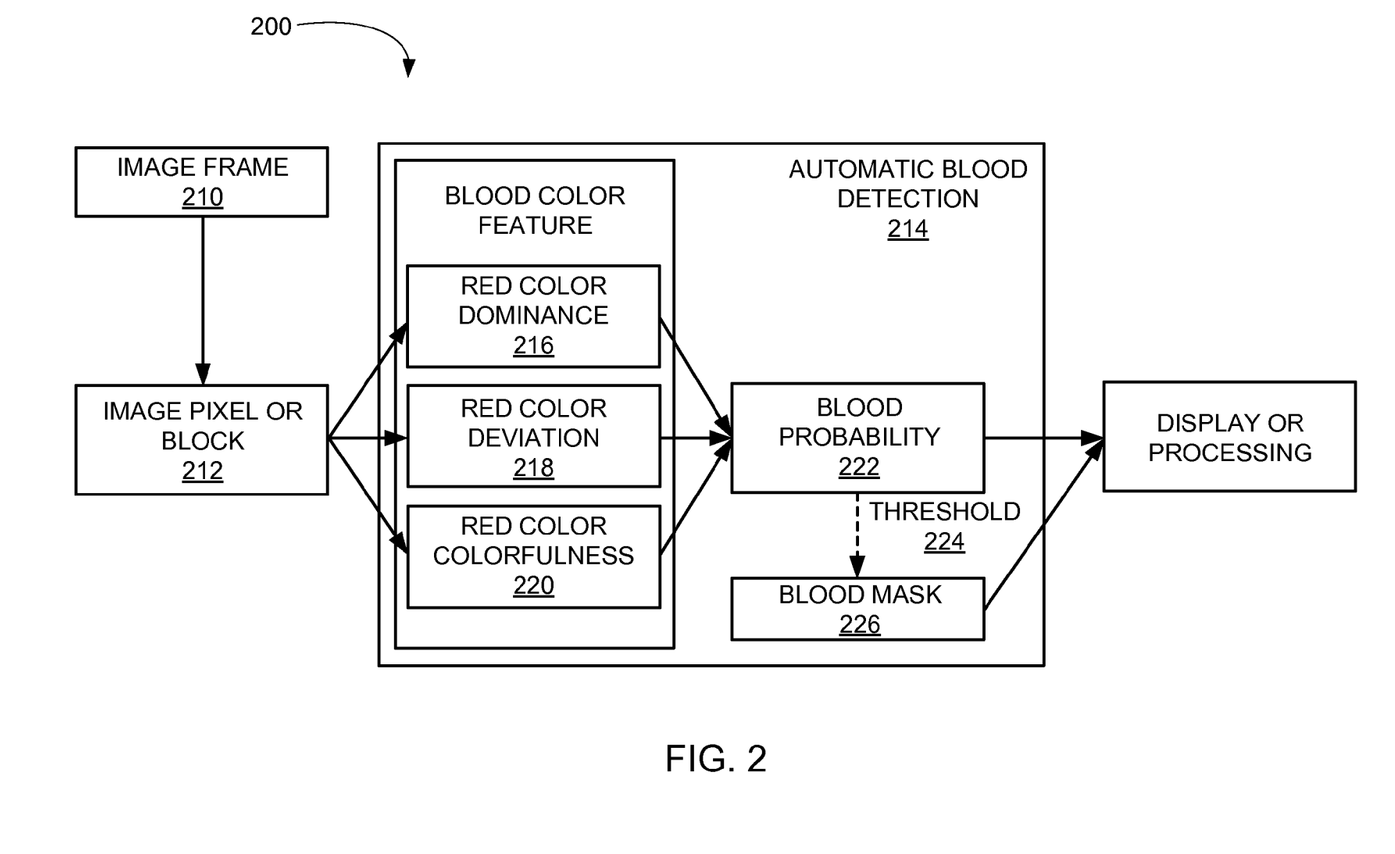
FIG. 2 is a system diagram of the blood detection system in a second embodiment of the present invention.

Referring now to FIG. 2, therein is shown a system diagram of the blood detection system 200 in a second embodiment of the present invention. Starting with an input image frame 210, the image block module breaks down the input image frame 210 into image blocks 212, which can be a single pixel or groups of pixels, for example. The image blocks 212 can also be thought of as being extracted from the input image frame 210.

Each of the image blocks 212 then goes through an automatic blood detection block 214 in the automatic blood detection module. Each of the image blocks 212 goes through three separate and different blood probability tests. In this example, the feature of blood is linked to the color red. In a red color dominance test 216 the color red in each of the image blocks 212 is emphasized and a probability of blood being present in each of the image blocks 212 is calculated using the red color dominance module. In a red color deviation test 218, the deviation of the color in each of the image blocks 212 away from red is determined, and the probability of blood being present in each of the image blocks 212 is calculated using the red color deviation module. In a red color colorfulness test 220, each of the image blocks 212 containing a low red value is given a lower probability of blood being present proportional to how low the red value is in each of the image blocks 212, and the probability of blood being present in each of the image blocks 212 is calculated using the red color colorfulness module.

The probabilities from each of the red color dominance test 216, the red color deviation test 218, and the red color colorfulness test 220 are then combined to determine an overall blood probability 222 for each of the image blocks 212 of the input image frame 210. The overall blood probability 222 can then be compared to a blood detection threshold probability 224 using the threshold module, and a blood mask 226 can be generated only highlighting the areas where the overall blood probability 222 crosses over the blood detection threshold probability 224 using the masking module. In other words, that blood has been detected to a high probability.

Once the blood mask 226 has been generated, it can be used for various applications. For example, the blood mask 226 can be displayed as an outline on an output image frame on the display interface 106 of FIG. 1 clearly highlighting where blood is within the output image frame in real time. This can be done using the overlay module, for example. Visual or audible alarms can also be activated if it is determined that more blood than expected is shown in the output image frame. The blood mask 226 can also be used to perform various real-time image enhancements.

It has been discovered that the blood detection system 200 using only the red color dominance test 216, the red color deviation test 218, and the red color colorfulness test 220 to determine the overall blood probability 222 improves awareness and ease of image interpretation for medical staff, likely leading to improved patient outcomes. Because the red color dominance test 216, the red color deviation test 218, and the red color colorfulness test 220 operate on the image blocks 212 of the same size within the input image frame 210, and do not require processor-intensive operations such as segmentation, edge detection, or line detection, the blood detection system 200 can operate in real-time, allowing for near-instant detection of blood. Quicker detection of blood in the output image frame allows for a quicker response, faster mitigation of bleeding, and lower rates of complications, for example.

Figure 3:
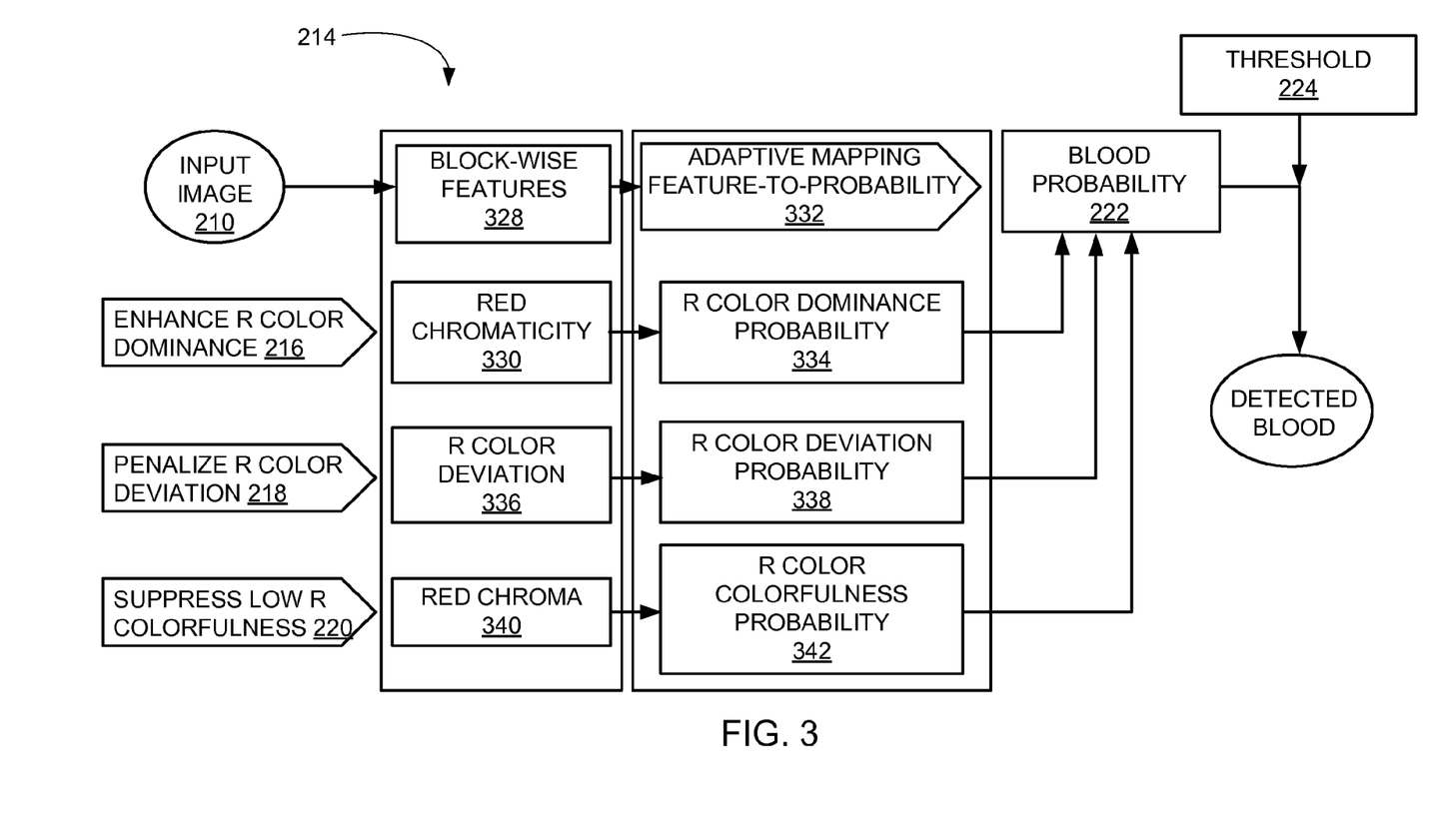
FIG. 3 is a detailed flow chart of the automatic blood detection block.

Referring now to FIG. 3, therein is shown a detailed flow chart of the automatic blood detection block 214. As described above, the automatic blood detection block 214 contains the red color dominance test 216, the red color deviation test 218, and the red color colorfulness test 220, which are shown in greater detail in this figure.

Each of the tests is performed on a per-block or per-pixel basis. First, the input image frame 210 undergoes a block-wise feature generation step 328 to modify features of each block in different ways. It has been discovered that different tests that go through the block-wise feature generation step 328 are important when calculating the overall blood probability 222 because a combination of different approaches to determining the overall blood probability 222 leads to greater accuracy with only a small increase in required processing power and time necessary for calculation.

The red color dominance test 216 starts with emphasizing the color red in each of the image blocks 212 of FIG. 2. Each of the image blocks 212 has a red chromaticity value 330 calculated dependent on the amount of red in the image blocks 212. The red chromaticity value 330 can be calculated in various ways. For example, the red chromaticity value 330 can be calculated by Equation 1A, which is for example only and is not meant to be limiting. In the following equation and other equations, unless otherwise indicated, R stands for a red value, G stands for a green value, and B stands for a blue value within an RGB color space. The meaning of any variables is known to one of ordinary skill in the art.

$$f_1 = R/(R+G+B) \quad \text{Equation 1A:}$$

Following the calculation of the red chromaticity value 330, the red chromaticity value 330 enters into an adaptive mapping step 332, in which a red color dominance probability 334 is calculated. The red color dominance probability 334 is the probability that the red chromaticity value 330 is indicating that blood is present. The adaptive mapping step 332 to calculate a probability value can be done using sigmoid functions, an adaptive mapping function, or machine-learning, for example. For example, the red color dominance probability 334 can be calculated using Equation 1B, where μ and σ refer to the mean and standard deviation values of the image frame respectively, which is for example only and is not meant to be limiting.

$$p_1 = 1/(1 + \exp[-(f_1 - \mu_{F1})/\sigma_{F1}]) \quad \text{Equation 1B:}$$

The red color deviation test 218 starts with determining how far away from the color red the color of each of the image blocks 212 is within a standard color space, such as RGB or any other color space. The deviation from red color, or a red color deviation value 336, can be calculated in various ways. For example, the red color deviation value 336 can be calculated by looking at other colors within the color space. Within any color space, a given color value is a mixture of the available color values. For example, within RGB color space, the larger the difference between a green color value and a blue color value, the less likely the color of one of the image blocks 212 can be seen as a red color. This means that the red color deviation value 336 can be calculated by Equation 2A, which is for example only and is not meant to be limiting.

$$f_2 = |G - B| \quad \text{Equation 2A:}$$

Following the calculation of the red color deviation value 336, the red color deviation value 336 enters into the adaptive mapping step 332. A red color deviation probability 338 is the probability that the deviation from red is low enough to indicate blood is present. The adaptive mapping step 332 can be performed by any of the methods noted above. For example, the red color deviation probability 338 can be calculated using Equation 2B, which is for example only and is not meant to be limiting.

$$p_2 = 1/(1 + \exp[-(f_2 - \mu_{F2})/\sigma_{F2}]) \quad \text{Equation 2B:}$$

The red color colorfulness test 220 starts with determining a minimum usable level of red color in any given one of the image blocks 212. A red chroma value 340 can correspond to the level of red in each of the image blocks 212. The red chroma value 340 can function as a low light check, where areas of the input image frame 210 that are too dark to be of use can be discarded, for example. The red chroma value 340 can be calculated by Equation 3A, which is for example only and is not meant to be limiting.

$$f_3 = R - \min(R, G, B) \quad \text{Equation 3A:}$$

Following the calculation of the red chroma value 340, the red chroma value 340 enters into the adaptive mapping step 332. A red color colorfulness probability 342 is the probability that there is a useable amount of red color in each of the image blocks 212 such that a good determination of whether blood is present can be made. The adaptive mapping step 332 can be performed by any of the methods noted above. For example, the red color colorfulness probability 342 can be calculated using Equation 3B, which is for example only and is not meant to be limiting. In Equation 3B, the variables can be fixed to specific values to tune the probability as necessary. For example, τ can equal 24 and γ can equal 4, but these values are for example only.

$$p_3 = 1/(1 + \exp[-(f_3 - \tau)/\gamma]) \quad \text{Equation 3B:}$$

Once the red color dominance probability 334, the red color deviation probability 338, and the red color colorfulness probability 342 are calculated using their respective equations, the overall blood probability 222 can be calculated by taking the product of the various probabilities. The overall blood probability 222 can be then compared to the blood detection threshold probability 224 to see if the overall blood probability 222 is high enough to be considered as showing the presence of blood.

It has been discovered that the blood detection system 200 of FIG. 2 combining the red color dominance probability 334, the red color deviation probability 338, and the red color colorfulness probability 342 to determine the overall blood probability 222 makes real-time detection of blood in video possible. Because there are no processor-intensive steps such as edge detection, segmentation, or motion modeling, determining the overall blood probability 222 can be done very quickly but also accurately in a video image, allowing for a blood overlay, for example, to be generated in real time.

Figure 4:
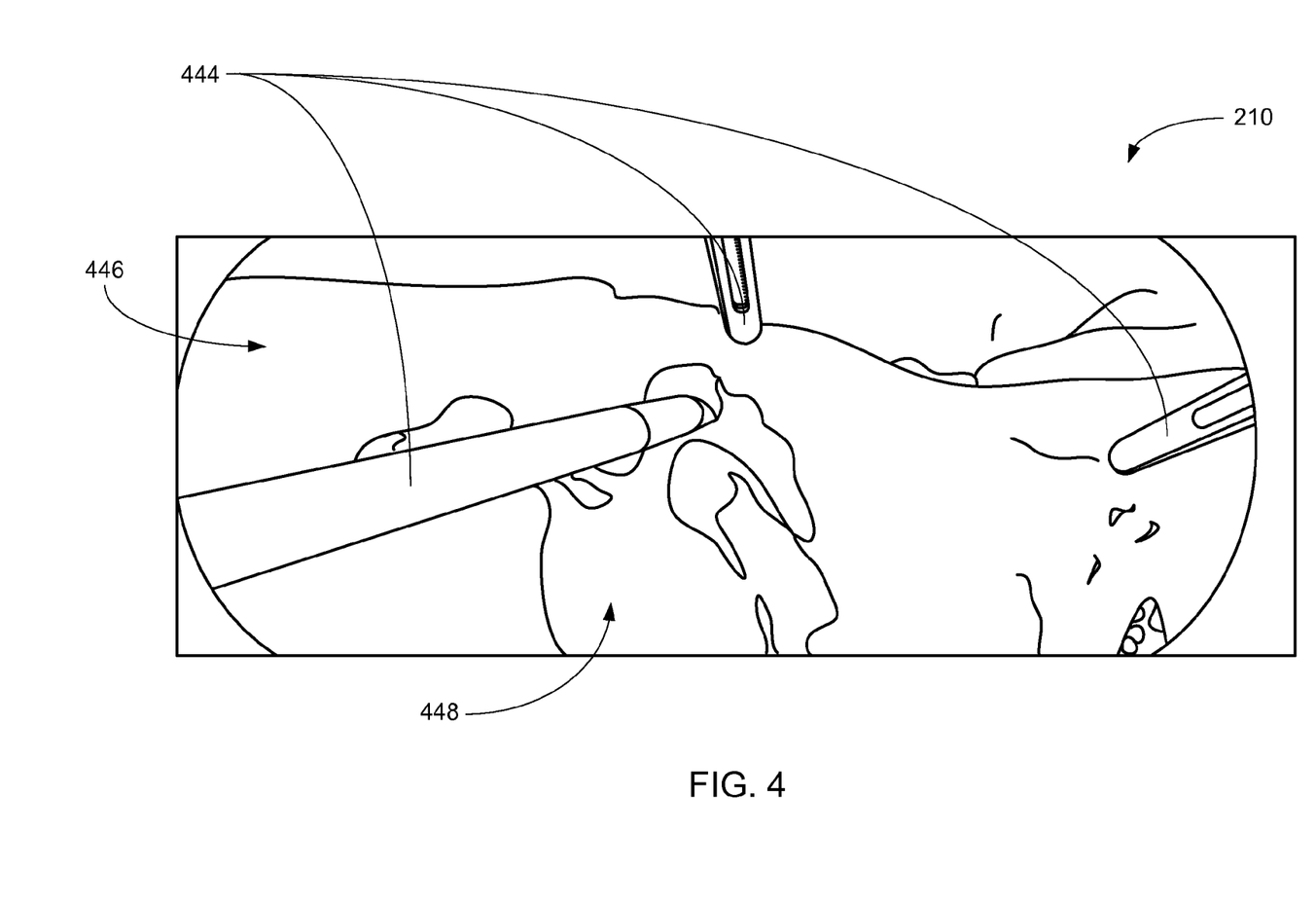
FIG. 4 is an example of the input image frame in an image capture phase of operation.

Referring now to FIG. 4, therein is shown an example of the input image frame 210 in an image capture phase of operation. This example of the input image frame 210 shows surgical tools 444, a background tissue region 446, and a blood region 448. The blood region 448 is labeled in this figure because it is only a line drawing and the blood region 448 is identified out of necessity. It is understood that the blood region 448 is not a predetermined region in normal use of the blood detection system 100 of FIG. 1.

Figure 5:
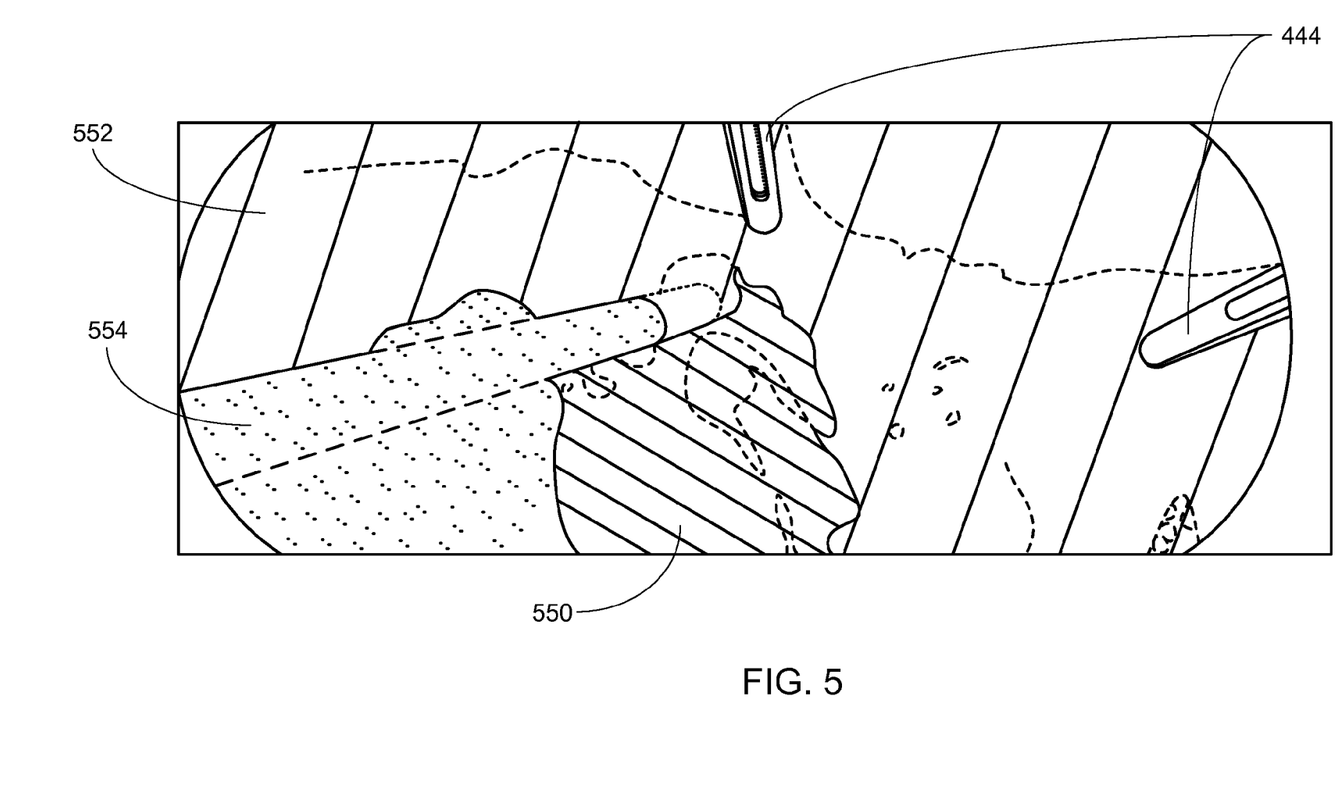
FIG. 5 is the input image frame of FIG. 4 in a probability mapping phase of operation.

Referring now to FIG. 5, therein is shown the input image frame 210 of FIG. 4 in a probability mapping phase of operation. The input image frame 210 is broken down into the image blocks 212 of FIG. 2 as described above and each of the image blocks 212 is processed through the automatic blood detection block 214 of FIG. 3 as described above. The overall blood probability 222 of FIG. 2 is calculated for each of the image blocks 212 after processing through the automatic blood detection block 214, and regions of the overall blood probability 222 can be generated by grouping the image blocks 212 which have similar levels of the overall blood probability 222.

For example, the image blocks 212 can be grouped into a high blood probability region 550, an intermediate blood probability region 552, and a low blood probability region 554. In this example, visualization of the overall blood probability 222, solid lines show boundaries between regions and dotted lines show boundaries between the image blocks 212 having different levels of the overall blood probability 222 but not necessarily to a level that would place the image blocks 212 in a different probability region.

In this example, for the purposes of clarity, the high blood probability region 550, the intermediate blood probability region 552, and the low blood probability region 554 are filled in with patterns to distinguish regions from each other. It is understood that the patterns are for visual clarity only, and any kind of visualization can be used if the probability regions are displayed. For example, the high blood probability region 550 can have closely spaced diagonal lines, the intermediate blood probability region 552 can be marked with widely spaced diagonal lines slanted in an opposite direction, and the low blood probability region 554 can be marked with a pattern of dots. The diagonal lines for distinguishing the various regions are all straight and parallel to each other to distinguish them from the straight lines of the surgical tools 444. The high blood probability region 550 can correspond to a region where the overall blood probability 222 is higher than the blood detection threshold probability 224 of FIG. 2, for example.

In this figure, an example image is shown, but it is understood that this is only for illustration of the probability mapping phase of operation. In normal operation of the blood detection system 100 of FIG. 1 which has real-time detection of blood in the input image frame 210, a probability map would likely not be displayed. However, the probability map could be displayed during a debugging or calibration process, for example. In this example, some of the surgical tools 444 are shown with solid lines because the surgical tools 444 can sometimes be excluded from the probability regions. It is also understood that three or more regions of blood probability are not necessary to determine the high blood probability region 550. For example, a simple check of which of the image blocks 212 having the overall blood probability 222 greater than the blood detection threshold probability 224 can be done in order to find the high blood probability region 550 and define the boundaries of the blood mask 226.

Figure 6:
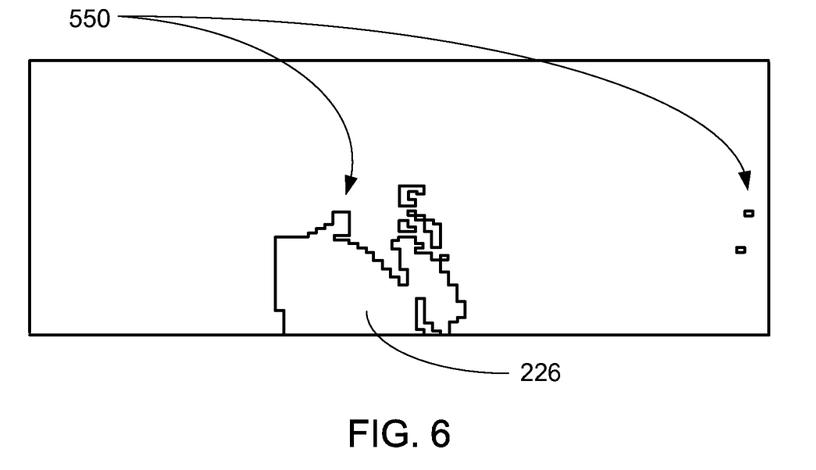
FIG. 6 is the high blood probability region of FIG. 5 in a mask generation phase of operation.

Referring now to FIG. 6, therein is shown the high blood probability region 550 in a mask generation phase of operation. The high blood probability region 550 can be isolated from the rest of the input image frame 210 of FIG. 2 to create the blood mask 226. The blocky appearance of the blood mask 226 is for example only, and can be indicative of the size of the image blocks 212 of FIG. 2 used when calculating the overall blood probability 222 of FIG. 2 for each of the image blocks 212. It is understood by one of ordinary skill in the art that the size of the image blocks 212 can be adjusted for a particular application to be larger or smaller as necessary and as processing power permits.

In this example, two small portions of the high blood probability region 550 can be seen on the right side of the figure. These small portions can be handled in various ways. For example, if the small portions are under a particular threshold of size or distance from the largest portion of the high blood probability region 550, the small portions may be excluded from further processing as not being of interest. As another example, the small portions may be analyzed as a group to check for indications of blood spray, which may result in many small portions of the high blood probability region 550 far from the largest portion.

Figure 7:
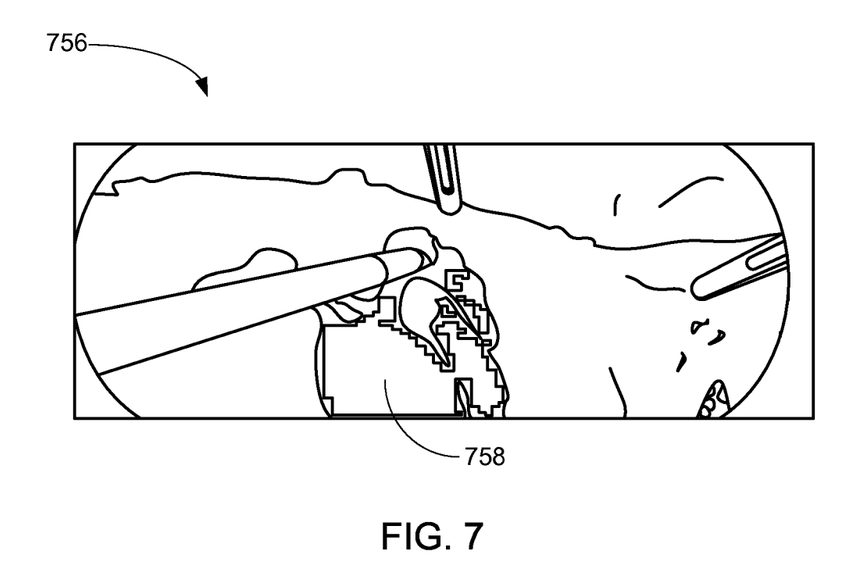
FIG. 7 is an example of an output image frame.

Referring now to FIG. 7, therein is shown an example of an output image frame 756. The output image frame 756 can be a combination of the input image frame 210 of FIG. 4 captured by the camera 102 of FIG. 1 and a blood mask overlay 758. The blood mask overlay 758 is generated using the blood mask 226 of FIG. 6. In this example, the blood mask overlay 758 is shown as an outline overlaying the area of which has been determined to have a high probability of the presence of blood. The blood mask overlay 758 can be shown in various ways. For example, the blood mask overlay 758 can be shown as a transparent mask with only the outline shown, a partially transparent overlay, or some combination thereof. The blood mask overlay 758 can be shown as a color that contrasts strongly with the background colors in order to ensure that the blood mask overlay 758 stands out. For example, the blood mask overlay 758 can be shown as green, pink, white, or other color which stands out from background colors.

The blood mask overlay 758 or the blood mask 226 can also provide a mask such that underlying pixel parameters or values of the input image frame 210 can be further processed and used for image enhancement. For example, the blood mask overlay 758 or the blood mask 226 can be used to delineate areas of the input image frame 210 to process differently from other areas in order to generate an enhanced output image frame. This can be done by reading the underlying pixel values of the pixels of the input image frame 210 and modifying the underlying pixel values differently based on areas delineated by the blood mask 226, for example.

Figure 8:
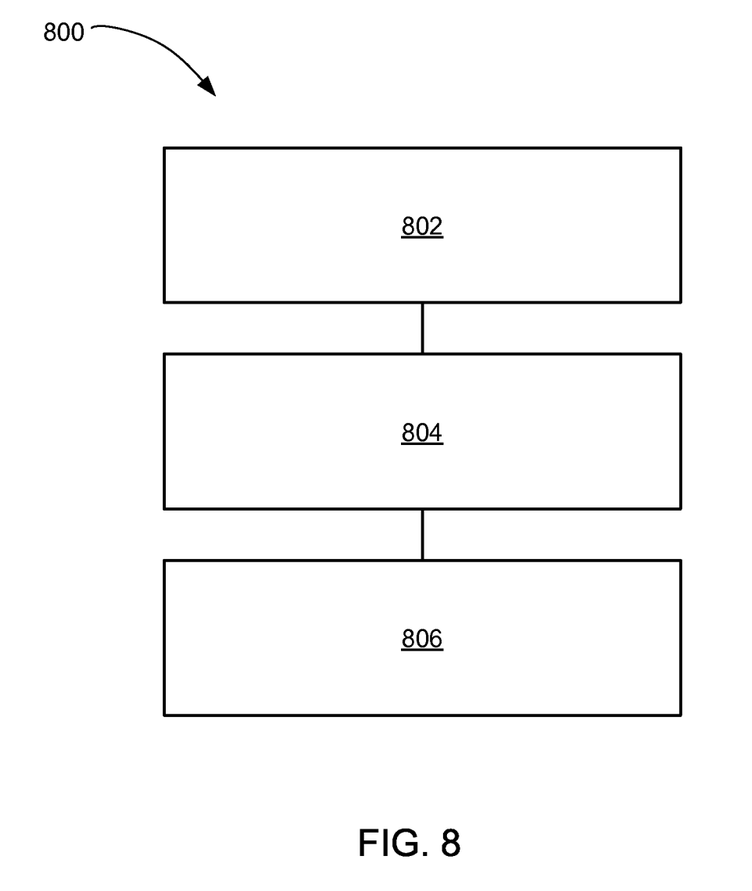
FIG. 8 is a flow chart of a method of operation of blood detection system in a further embodiment of the present invention.

Referring now to FIG. 8, therein is shown a flow chart of a method 800 of operation of a blood detection system in a further embodiment of the present invention. The method 800 includes: obtaining an input image frame with a camera in a block 802; extracting image blocks from the input image frame in a block 804; and calculating an overall blood probability of the image blocks including: determining a red color dominance probability, determining a red color deviation probability, and determining a red color colorfulness probability in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a blood detection system comprising:
   obtaining an input image frame with a camera;
   extracting image blocks from the input image frame; and
   calculating an overall blood probability of the image blocks, wherein the overall blood probability is between 0% and 100%, inclusive, including:
   calculating a red color dominance probability,
   calculating a red color deviation probability, and
   calculating a red color colorfulness probability,
      wherein the overall blood probability is calculated by taking a product of the red color dominance probability, red color deviation probability and the red color colorfulness probability.

2. The method as claimed in claim 1 further comprising providing a blood detection threshold probability.

3. The method as claimed in claim 1 further comprising determining a high blood probability region by comparing the overall blood probability to a blood detection threshold probability.

4. The method as claimed in claim 1 further comprising generating a blood mask based on the overall blood probability being higher than a blood detection threshold probability, wherein the blood mask is displayed as an outline to an output image frame for highlighting where blood is within the output image frame in real time.

5. The method as claimed in claim 1 wherein extracting image blocks from the input image frame includes grouping blocks of pixels to form each of the image blocks.

6. A method of operation of a blood detection system comprising:
   obtaining an input image frame with a camera;
   extracting image blocks from the input image frame;
   calculating an overall blood probability of the image blocks, wherein the overall blood probability is between 0% and 100%, inclusive, including:
      calculating a red color dominance probability,
      calculating a red color deviation probability, and
      calculating a red color colorfulness probability, wherein the overall blood probability is calculated by taking a product of the red color dominance probability, red color deviation probability and the red color colorfulness probability;
   providing a blood detection threshold probability;
   determining a high blood probability region by comparing the overall blood probability to the blood detection threshold probability;
   generating a blood mask based on the high blood probability region; and
   generating a blood mask overlay based on the blood mask for display on a display interface.

7. The method as claimed in claim 6 wherein calculating the red color dominance probability includes:
   determining a red chromaticity value by enhancing red color dominance; and
   performing an adaptive mapping step for determining the red color dominance probability based on the red chromaticity value, wherein the adaptive mapping step utilizes an adaptive mapping function.

8. The method as claimed in claim 6 wherein calculating the red color deviation probability includes:
   determining a red color deviation value by penalizing red color deviation; and
   performing an adaptive mapping step for determining the red color deviation probability based on the red color deviation value.

9. The method as claimed in claim 6 wherein calculating the red color colorfulness probability includes:
   determining a red chroma value by suppressing low red color colorfulness; and
   performing an adaptive mapping step for determining the red color colorfulness probability based on the red chroma value.

10. The method as claimed in claim 6 further comprising generating an output image frame by overlaying the blood mask overlay on the input image frame for display on the display interface.

11. A blood detection system comprising:
   a camera for obtaining an input image frame; and
   a processor connected to the camera, the processor including:
      an image block module for extracting image blocks from the input image frame, and
      an automatic blood detection module, coupled to the image block module, for calculating an overall blood probability of the image blocks, wherein the overall blood probability is between 0% and 100%, inclusive, including:
         calculating a red color dominance probability,
         calculating a red color deviation probability, and
         calculating a red color colorfulness probability, wherein the overall blood probability is calculated by taking a product of the red color dominance probability, red color deviation probability and the red color colorfulness probability.

12. The system as claimed in claim 11 wherein the processor is for providing a blood detection threshold probability.

13. The system as claimed in claim 11 wherein the processor includes a threshold module, within the automatic blood detection module, for determining a high blood probability region by comparing the overall blood probability to a blood detection threshold probability.

14. The system as claimed in claim 11 wherein the processor includes a masking module, coupled to the automatic blood detection module, for generating a blood mask based on the overall blood probability being higher than a blood detection threshold probability.

15. The system as claimed in claim 11 wherein the image block module is for grouping blocks of pixels to form each of the image blocks.

16. The system as claimed in claim 11 wherein the processor is for providing a blood detection threshold probability, the processor also including:
   a threshold module, within the automatic blood detection module, for determining a high blood probability region by comparing the overall blood probability to the blood detection threshold probability;
   a masking module, coupled to the automatic blood detection module, for generating a blood mask based on the high blood probability region; and an
   overlay module, coupled to the masking module, for generating a blood mask overlay based on the blood mask for display on a display interface.

17. The system as claimed in claim 16 wherein the processor includes:
   a red color dominance module within the automatic blood detection module for determining the red color dominance probability including:
      determining a red chromaticity value by enhancing red color dominance; and
      performing an adaptive mapping step for determining the red color dominance probability based on the red chromaticity value.

18. The system as claimed in claim 16 wherein the processor includes:
   a red color deviation module for determining the red color deviation probability including:
      determining a red color deviation value by penalizing red color deviation; and
      performing an adaptive mapping step for determining the red color deviation probability based on the red color deviation value.

19. The system as claimed in claim 16 wherein the processor includes:
   a red color colorfulness module for determining the red color colorfulness probability including:
      determining a red chroma value by suppressing low red color colorfulness; and
      performing an adaptive mapping step for determining the red color colorfulness probability based on the red chroma value.

20. The system as claimed in claim 16 wherein the processor is for generating an output image frame by overlaying the blood mask overlay on the input image frame for display on the display interface.

21. The system as claimed in claim 16 wherein the processor is for generating an enhanced output image frame by using underlying pixel values of the input image frame based on the blood mask for display on the display interface.

* * * * *